(12) United States Patent
Mair et al.

(10) Patent No.: US 12,290,902 B2
(45) Date of Patent: May 6, 2025

(54) CENTERING DEVICE AND FASTENING ARRANGEMENT

(71) Applicant: SFS Group International AG, Heerbrugg (CH)

(72) Inventors: Roland Mair, Götzis (AT); Hanspeter Kuster, Balgach (CH); Markus Andersag, Lustenau (AT)

(73) Assignee: SFS Group International AG, Heerbrugg (CH)

( * ) Notice: Subject to any disclaimer, the term of this patent is extended or adjusted under 35 U.S.C. 154(b) by 0 days.

(21) Appl. No.: 18/239,802

(22) Filed: Aug. 30, 2023

(65) Prior Publication Data
US 2024/0066671 A1  Feb. 29, 2024

(30) Foreign Application Priority Data

Aug. 30, 2022  (EP) .................................... 22192988

(51) Int. Cl.
*B25B 23/00* (2006.01)
*B23B 35/00* (2006.01)
*B23B 47/28* (2006.01)

(52) U.S. Cl.
CPC ............ *B25B 23/005* (2013.01); *B23B 35/00* (2013.01); *B23B 47/287* (2013.01)

(58) Field of Classification Search
CPC ..... B25B 23/005; B23B 47/287; B23B 49/02; B23B 35/00
See application file for complete search history.

(56) References Cited

U.S. PATENT DOCUMENTS

| 3,859,002 | A |   | 1/1975  | Sauey |   |
|---|---|---|---|---|---|
| 8,020,353 | B2 | * | 9/2011  | Gaudreau | E04F 13/0864 |
|   |   |   |   |   | 52/549 |
| 8,616,818 | B2 | * | 12/2013 | Travis | F16B 41/002 |
|   |   |   |   |   | 411/533 |
| 8,683,770 | B2 | * | 4/2014  | diGirolamo | E04B 2/768 |
|   |   |   |   |   | 52/712 |
| 8,806,829 | B2 | * | 8/2014  | Pelc | E04F 15/02 |
|   |   |   |   |   | 411/902 |

(Continued)

FOREIGN PATENT DOCUMENTS

| DE | 3420863  | 1/1985 |
| DE | 20008638 | 8/2000 |

(Continued)

*Primary Examiner* — Lawrence Averick
(74) *Attorney, Agent, or Firm* — Volpe Koenig

(57) ABSTRACT

A centering device for guiding a fastener or a drill during a setting operation. The centering device is arranged in or at a passage opening of a component, which forms a fastening point. The component can be a substantially flat metal part, in particular a lug or bracket for a façade element. The centering device is arranged at the plane of the back of the passage opening and includes a collar and connecting elements between the collar and the edge of the passage opening. The collar has a substantially flat to bead-like annular shape and is formed in the component. The central opening of the collar forms a centering seat for a fastener or drill during setting. A fastening arrangement has a component, centering device and matching screw. The screw forms a form fit via its lower head portion in the passage opening after completion of the setting process.

6 Claims, 3 Drawing Sheets

(56) References Cited

U.S. PATENT DOCUMENTS

| | | | |
|---|---|---|---|
| RE46,844 E * | 5/2018 | diGirolamo | E04B 2/768 |
| 10,125,800 B1 * | 11/2018 | Dominguez | B25B 13/481 |
| 10,132,341 B2 * | 11/2018 | di Girolamo | F16B 5/0225 |
| 11,480,210 B2 * | 10/2022 | Shen | F16B 39/28 |
| 2007/0144096 A1 | 6/2007 | O'Neal | |
| 2010/0088988 A1 * | 4/2010 | Gaudreau | E04F 13/0864 |
| | | | 52/522 |
| 2012/0213611 A1 * | 8/2012 | Travis | F16B 43/00 |
| | | | 411/372 |
| 2012/0266545 A1 * | 10/2012 | diGirolamo | E04B 2/768 |
| | | | 52/655.1 |
| 2013/0247504 A1 * | 9/2013 | Pelc | E04F 15/02044 |
| | | | 52/704 |
| 2020/0240456 A1 * | 7/2020 | Shen | F16B 25/103 |

FOREIGN PATENT DOCUMENTS

| | | |
|---|---|---|
| EP | 3564464 | 11/2019 |
| EP | 3960963 | 3/2022 |
| WO | 03026823 | 4/2003 |

* cited by examiner

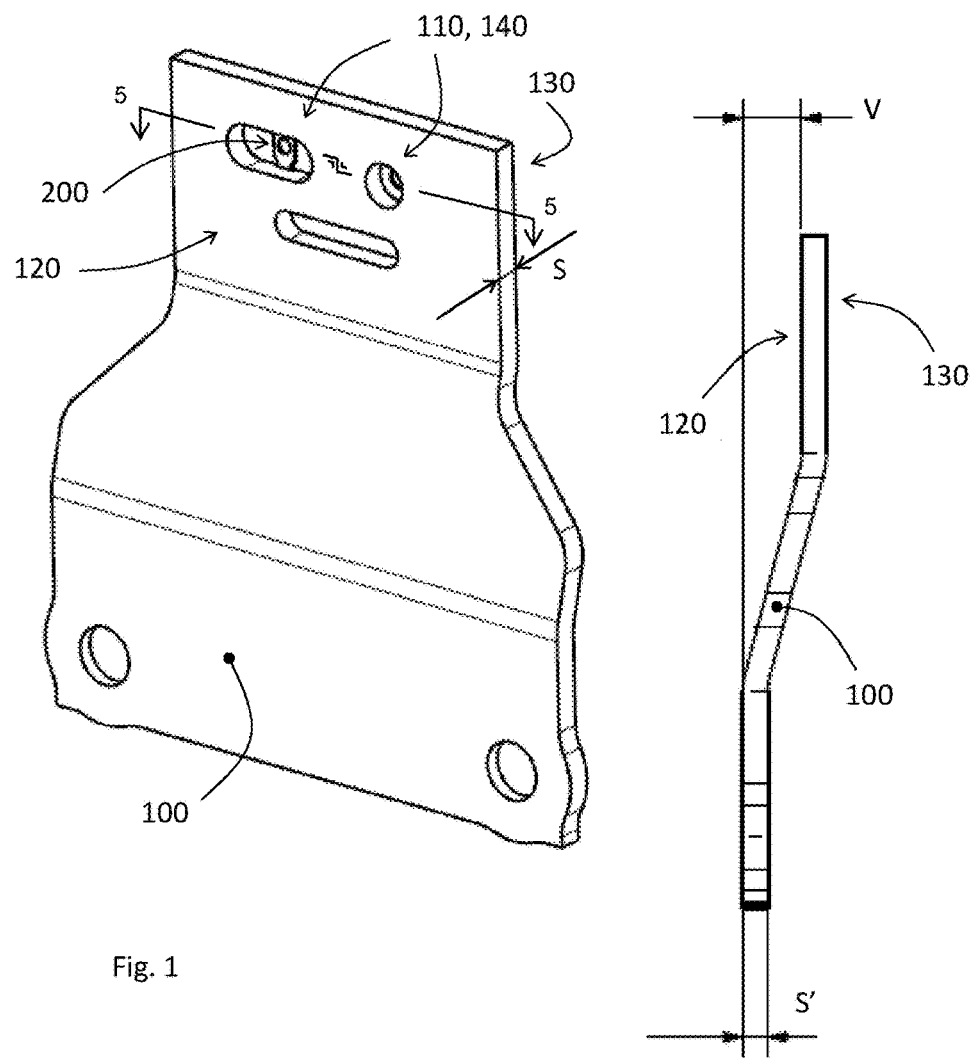
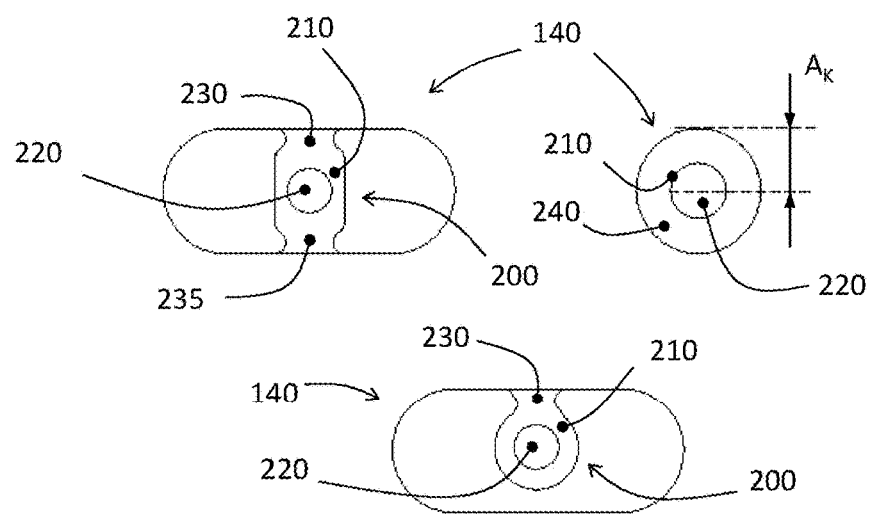
Fig. 1
Fig. 2

CENTERING DEVICE AND FASTENING ARRANGEMENT

CROSS-REFERENCE TO RELATED APPLICATIONS

This application claims priority from European Patent Application No. 22192988.8, filed Aug. 30, 2022, which is incorporated herein by reference as if fully set forth.

TECHNICAL FIELD

The present invention relates to a centering device used to set a fastener such as a drill screw or a drill bit itself within a hole or slot in a predefined location. The centering device is integrally designed, i.e. is a part of that component which is to be fastened to a substructure or other building element by means of a fastener.

Furthermore, a fastening arrangement consisting of a component with centering device and fastener is described.

BACKGROUND

In the construction industry today, functional building envelopes are created, especially in office and commercial construction, which must meet high requirements in terms of safety, transparency, insulation, but also design and maintainability. Particularly in the case of sophisticated architecture, the technical fastening of façade elements must be carried out in such a way that the overall appearance of the building is not negatively affected.

The human eye is capable of recognizing individual, incorrectly processed façade panels as deviations from the pattern on an evenly clad façade. Avoiding this places great demands on the quality of the installation. At the same time, however, it must be taken into account that due to the different thermal loads on the façade panels and the supporting substructure, it is not possible to fasten them exclusively with fixed points.

Especially in the case of narrow joints between façade panels, deviations in the millimeter range can already become problematic. Such a difference can be caused, for example, by a fitter not placing a fastener with pinpoint accuracy. When the screw is tightened, it is then quite possible that the façade panel is pulled or pushed slightly in a certain direction in the fastening plane. If the fastener is then a self-tapping drill screw that engages in a metal substructure or wooden substructure, subsequent corrections are very difficult and expensive to implement.

PRIOR ART

In the prior art, there are basically various approaches to solving this problem. Known, for example, are drilling jigs as described in DE 200 08 638 U1. This is a guide unit for a drill in the form of a hollow cylinder which has a conical point at its end facing the drilling side. The cone is placed on a passage opening in the component to be fastened. This passage opening has a diameter larger than the hole to be drilled.

A disadvantage, especially for the above application, is that the setting process requires pre-drilling of the substructure and another tool must be used.

Alternatively, EP 3 960 963 and 3 564 464 describe centering sleeves that can be placed on a drill screw and take over centering during the critical period until the tip of a drill screw has sunk into the material.

With centering sleeves designed in this way, there is a residual risk of sleeve residues getting caught in the drill hole. This can occur in particular if the screw has a high feed rate during setting and/or the sleeve residues cannot be ejected laterally fast enough. In particular, if a self-drilling screw equipped in this way is to be set in a recess, sleeves may be unsuitable.

SUMMARY

The present invention therefore has the object of avoiding these disadvantages of the prior art, in particular of enabling safe and simple assembly of components of the type described and of permitting centered and guided setting of a fastener.

For the purposes of this invention, a fastening point is an opening in a component through which a fastener can be passed, which in turn holds said component in a defined position on a base or substructure after completion of the setting process. A fastening point can be both a fixed point and a sliding point. Particularly in the case of a sliding point such as an elongated hole, the component can move within certain limits along the longitudinal axis defined by the opening. Functionally similar fastening points with structural differences or variants are equivalently included.

Specifically, the object is achieved by a centering device at the fastening point of a component according to the features of the independent device claim. The dependent features describe useful variants and further developments of the invention.

The present invention describes a centering device which is suitable and designed for guiding a fastener or a drill during the setting process. The centering device is arranged in or at a passage opening of a component, the passage opening representing a fastening point of the component. The component is a substantially flat, plate-shaped metal part with a front side and a rear side. These two define, at least in the region of the fastening point, two substantially parallel planes with spacing S. The fastening point thus represents a passage opening in the component between the front side and the rear side. In particular, the component may be a lug or a bracket which is fastened to a façade element on the one hand and to a substructure on the other hand. However, the functionality and usefulness of a centering device described here are not limited to this application.

The centering device is arranged in or near the plane of the rear side in the passage opening. The front side means the side of the component facing a fitter during the setting process, the rear side faces the substructure to which the component is to be fastened.

A centering device itself basically includes a collar and connecting elements between the collar and the edge of the passage opening. The shape of the collar can be described as substantially flat annular and is formed from the metal of the component. The collar may or may not be bead-shaped in the sense that it has a greater thickness than the connecting elements. The central opening of the collar forms a centering seat for a fastener during its setting operation. The term annular in this context does not necessarily describe a perfect circular ring, but may include a somewhat irregularly shaped structure with a closed rim and a central opening, as long as it can functionally meet the criteria described herein.

The collar is connected to the edge of the passage opening of the fastening point via at least one web, a plurality of webs or a connecting surface. The web and the connecting surface represent the connecting elements; the collar is thus held in the passage opening by the webs and the connecting surface, respectively. This defines a nominal position of the collar relative to the edge of the passage opening.

One feature here is that the material thickness h of the web(s), collar or connecting surface is significantly less than the thickness S of the metal part in the area around the passage opening. In mathematical terms, therefore, h<<S. The thickness of the material is thus determined, as is familiar to a person skilled in the art, as the colloquial thickness of the material. As mentioned above, locally the collar and the connecting elements can have different thicknesses, but the above condition remains fulfilled.

The collar, web(s) or connecting surface are preferably integrally formed, i.e. coherent with the metal part or component itself, without supplementary, inserted, clamped or pressed-in components. Especially preferably, the passage opening, collar and web(s) or connecting surface are produced from the component itself by single- or multi-stage stamping and forming steps. This also ensures that the centering device is captively connected to the component.

A value useful in the application for the thickness h of a collar or connecting element is less than 1 mm, preferably 0.2 to 0.5 mm. The inner diameter of the central opening of the (essentially) annular collar is between 1.5 and 2.5 mm. The nominal diameter of a suitable fastener or drill would be 2.5 to approx. 4 mm, i.e. in any case larger than the central opening of the collar. By respective scaling and adjusting the thickness h, the functionality can be extended to larger diameters. Centering is achieved when the collar provides a supporting action during the initial screwing-in setting movement and prevents the tip of the drill or fastener from sliding away. Experience shows that the collar or the centering device is obsolete as soon as the drill/fastener engages in a centered manner in the material of the substructure.

For the person skilled in the art, it is common that, for example, in the field of façade construction, different façade panels require different fastenings. Not only the weight per panel will play a role, but also its size, the specified grid of the substructure and, in addition, safety and building regulations, which in turn are based on calculated wind loads and temperature fluctuations. These specifications plus the number of brackets per panel and the number of fasteners per bracket determine the dimensioning of the fasteners in terms of length, diameter and thread, among other things. Likewise, this determines the number of fixed and sliding points.

The centering device described here is designed for single use: The material thickness is selected so that the centering device is destroyed by the setting process and transported out of the opening, e.g. ejected by the thread of the fastener. However, depending on the application, design and material thickness, the material of the centering device can also be forced radially outwards, compacted there and remain in the passage opening. In this way, it may also be possible to achieve a tight fit instead of a pure form fit of the fastener in the passage opening.

It is functionally of secondary importance whether the fastener has a drill point, a displacement point or a classic screw point. The function of centering by the collar remains basically the same. For the person skilled in the art, the parameters "thickness h of the collar" and "diameter of the central opening of the collar" can be adapted to the planned application. Thus, fasteners with diameters of 4 mm, 6 mm or more are also conceivable, which can be guided through corresponding centering devices. In this case, no linear scaling of the material thicknesses of the collar or the webs is necessary, because the initial drilling of the fastener does not take place with the full diameter, but with the tip, and the centering device only plays a role for this first moment.

A setting operation will take place in such a way that a fitter will provide a component with an appropriate centering device, an appropriately sized fastener and a substructure. He will fix the component to the substructure at a given nominal position—either manually or by mechanical means. He can then apply the fastener with an appropriate tool so that the tip of the fastener is positioned in the central opening of the collar.

It is a common experience in any conventional setting operation that a very strong initial pressure on the fastener and thus on the substructure is counterproductive because it increases the tendency of the drill tip or fastener to deflect laterally. Unpredictable factors such as the surface condition of the substructure (notches) as well as an imperfect tip of the drill bit or fastener or an oblique placement play a role. The present invention minimizes or eliminates these factors by forced guidance of the fastener during the crucial first moments of the setting process. The above design of only millimeter-thin material may seem weakly designed, but it is an advantage. Too strong a collar could unnecessarily interfere with the main setting operation and too much material in the passage opening may be undesirable.

In another aspect and in the terminology of the claims, the invention permits a fastening arrangement consisting of a component having a fastener point with a centering device as described above. This further includes a fastener, wherein the fastener substantially comprises a head having a force application portion, a lower head portion, a threaded shank portion, and a tip portion. The tip region may be configured as a drill tip, a displacement tip, or a self-tapping tip.

The lower head portion has a diameter $D_U$ which is dimensioned in such a way that, upon completion of the setting operation, said lower head portion will form a form fit in the passage opening of the component in at least one direction. In other words, the precise setting operation provided by the centering device will locate the fastener relative to the edge of the passage opening such that the lower head portion contacts the edge at at least one point (or line) and positively restrains movement of the component at that point in the direction of the fastener without any post-setting slippage of the component in that direction. Any clamping of the component by the head is not taken into account here.

If a fastener of the type described here, i.e. with a lower head portion that is larger in diameter than the threaded portion (threaded shank portion), were used with a component without a centering device, the setting operation could begin too close to the edge of the passage opening device and the threaded section could contact the wall of the passage opening. Inevitably, once the setting operation reaches the transition to the lower head portion, the fastener would experience a force perpendicular to the direction of insertion. This would result in displacement of the component, tilting of the fastener, or damage to the component. Centering, on the other hand, ensures that the load-bearing lower head portion is precisely available as a contact surface for the wall of the passage opening in the component.

If the passage opening is an elongated hole, the diameter $D_U$ of the lower head portion can be selected so that it corresponds to the diameter transverse to the longitudinal axis of the elongated hole (plus/minus manufacturing tolerance). If the centering device is then also centered in the transverse diameter of the elongated hole, the fastener is set exactly so that the lower head portion is aligned in the elongated hole opening without changing the previously established nominal position of the component. In traditional setting operations, the fastener will tend to center the component, while here the opposite is achieved. Thus, with such an elongated hole, a slip point is achieved along the longitudinal axis of the elongated hole, while a form fit in the nominal position is maintained transversely.

If a classic round hole is used with a centering device according to the invention, the form fit is achieved in all directions of the fastening plane (clamping by the screw head normal to this plane not considered).

Preferably, the component is made of aluminum, especially if it is designed as a fastening lug for façade construction. Alternatively, it can also be made of steel by stamping and forming processes. Last but not least, a design in plastic is also conceivable, in particular fiber-reinforced plastic by injection molding. In this case, the component including the passage opening with centering device would be manufactured integrally.

In an alternative view, the invention can also be described as using a centering device, as explained in detail above, to guide a fastener or a drill during its setting operation. In this case, when an appropriately designed fastener is used, a fastening arrangement is obtained as described above.

BRIEF DESCRIPTION OF THE DRAWINGS

FIG. 1 shows component 100 with various fastening points in an oblique and side view;

FIG. 2 shows three exemplary designs of passage openings with centering devices;

DETAILED DESCRIPTION

Figure 3:
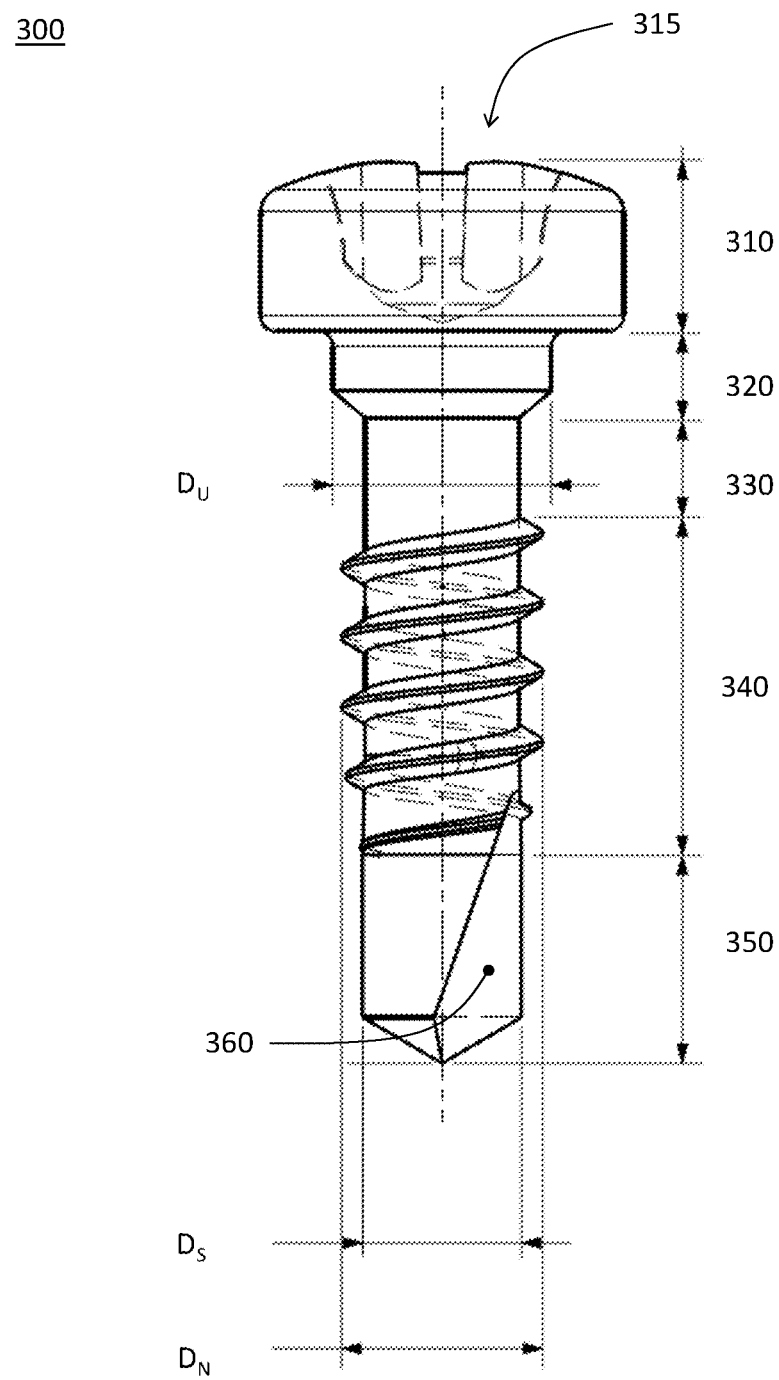
FIG. 3 shows a fastener in the form of a self-drilling screw having a lower head portion, in accordance with an embodiment of a fastening point.

FIG. 1 shows a component 100 with various fastening points in an oblique view on the left and side view on the right. Specifically, the component is designed as a lug that can connect a façade element to a substructure, see also FIG. 4. The metal part is shown as a flat component 100, here provided with an offset, which shows an elongated hole on its (in the drawing) upper third as well as a round hole, each with a centering device 200. Below this is a "classic" elongated hole. The left element of the drawing shows the front side 120. The two openings 140 each form a fastening point 110. The design as an elongated hole with centering device 200 allows a sliding point, while the right round hole forms a fixed point.

The centering device 200 in the left elongated hole is recessed, shown in the plane of the back side 130. The thickness of the metal part is indicated by S. In the right figure of FIG. 1, S' indicates the thickness of the metal part at the opposite ("bottom") end. The component 100 is described herein as a substantially flat, plate-shaped metal part, as is known and customary for the application described. Some variation (even local) in the thickness of the material (S') is not unusual.

The openings 140 are described herein as passage openings because they provide a passage for the fastener 300. Nonetheless, the centering device is shown at the bottom of the opening (as viewed from the front) or in the plane of the back 130 of the component 100; it closes off a portion of the passage opening 140. Nonetheless, this does not make the opening 140 a blind hole.

The cranked embodiment shown in FIG. 1 on the right in the side view shows an offset by the distance V of the lower part of component 100 relative to the upper part. This offset is not mandatory to the invention in the embodiment shown, but is a design feature.

FIG. 2 shows three exemplary embodiments of passage openings with centering devices, which are designated as left, right and bottom in the following.

The illustration on the left shows a passage opening 140 as an elongated hole with a single, centrally located centering device 200. The collar 210 is configured as an irregularly shaped ring around the central opening 220 which merges into webs 230, 235 on two opposite sides which in turn merge into the longitudinal sides of the elongated hole. The illustration "below" shows a variant of an elongated hole, wherein here the collar 210 is connected to the edge of the elongated hole only on one side via a web 230.

The illustration on the right shows an embodiment of a centering device 200 having a round hole as a passage opening 140. The collar 210 around the central opening 220 merges seamlessly into the connecting surface 240, which connects the collar 210 to the edge of the passage opening 140. $A_K$ denotes half the diameter of the passage opening 140. This diameter approximates the diameter $D_U$ of the lower head portion of the fastener 300 with appropriately designed tolerances to achieve a snug fit.

Figure 5:
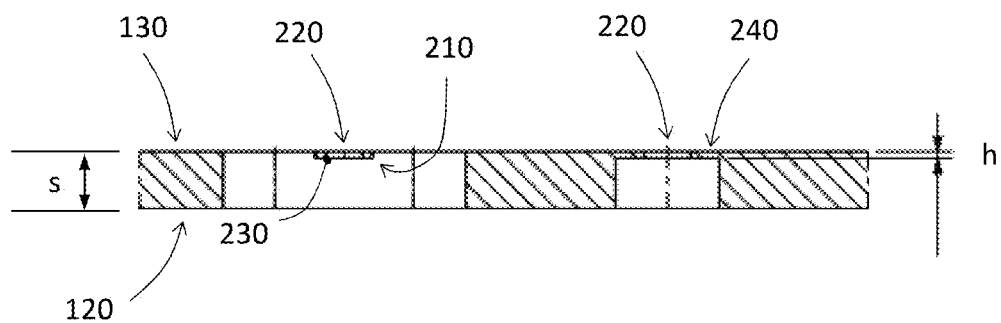
FIG. 5 is a partial cross-section taken along line 5-5 in FIG. 1.

FIG. 5 shows the material thickness h of the at least one web 230, the collar 210, and the connecting surface 240 is h<<S.

FIG. 3 shows a fastener 300 in the form of a self-drilling screw with a drill point 360. The main components, shown in the figure from top to bottom, are the head 310 with a countersunk force application 315, the lower head portion 320 with diameter $D_U$, a short non-threaded shank portion 330, a shank portion 340 with thread and a tip portion 350 with the drill point 360. The nominal diameter $D_N$ of the fastener is measured over the threaded tips as usual, the diameter of the drill tip $D_S$ is known to be made smaller than $D_U$ to allow the thread forming properties of the portion 340. Overall, $D_S<D_N<D_U$ applies.

The type of force application 315 is selected by the person skilled in the art depending on the requirements according to their expertise.

Figure 4:
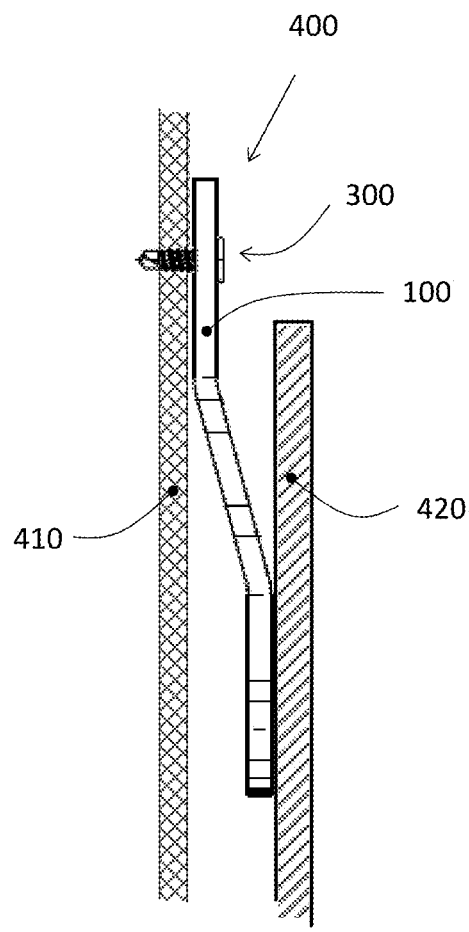
FIG. 4 shows a fastening arrangement.

A threadless shank portion 330 is preferred; with appropriate dimensioning of the substructure, it allows the thread to penetrate a load-bearing sheet of the substructure and this load-bearing sheet to come to rest in the area of the portion 330. This can prevent the opening created by the fastener (self-tapping drill screw) from being torn out by the thread of the fastener when the fastener is overtightened in the setting process, which can massively impair the pull-out forces of the fastening arrangement. The thread 340 may be of single-start or double-start design. FIG. 4 shows a fastening arrangement 400 with a façade element 420, to which a component 100—here designed as a lug—is fastened. The fastener 300 can be used to screw the component 100 to the substructure 410. Pre-drilling of the substructure 420 is not necessary when using a fastener 300 as in FIG. 3. If a pure thread-forming, non-self-drilling fastener is to be used, a centering device according to the present invention can also serve a drill in order to create a positionally accurate opening.

The invention claimed is:

1. A centering device (200) for guiding a fastener (300) or a drill during a setting operation, the centering device (200) being formed in a component (100) having at least one fastening point (110), the component (100) comprising a flat, plate-shaped metal part having a front side (120) and a rear side (130) which define two planes with a spacing S therebetween and which are parallel at least in a region of the fastening point, and the fastening point (110) includes a passage opening (140) in the component between the front side (120) and the rear side (130), the centering device (200) comprising:

a collar (210) arranged in or near the plane of the rear side (130) in the passage opening (140);

a connecting element between the collar and an edge of the passage opening;

wherein the collar (210) has a flat to bead-shaped annular form and is formed from metal of the component, a central opening (220) of the collar (210) forms a centering seat for a fastener (300) or drill during the setting operation, and the collar is connected to the edge of the passage opening (140) of the fastening point (110) via at least one web (230, 235) or a connecting surface (240) as the connecting elements; and wherein a material thickness h of each of the at least one web (230, 235) and the collar (210) or the connecting surface (240) is h<S.

2. The centering device (200) according to claim 1, wherein at least one of the collar (210), the at least one web (230, 235) or the connecting surface (240) are integrally formed, without complementary, inset, inserted, clamped or pressed-in structural elements.

3. The centering device (200) according to claim 1, wherein the passage opening (140) of the fastening point (110), the collar, and the at least one web or the connecting surface (240) are produced from the component (100) by single- or multi-stage stamping and forming steps.

4. The centering device (200) according to claim 1, wherein, as measured in a direction of the predetermined setting operation, the material thickness of the collar is less than 1 mm.

5. The centering device (200) according to claim 1, wherein an inner diameter of a central opening (220) of the annular collar (210) is between 1.5 and 2.5 mm.

6. A fastening arrangement (400) comprising:

the component (100) having the fastening point (110) with the centering device (200) according to claim 1;

a fastener (300) comprising a head (310) with a force application structure (315), a lower head portion (320), a shank portion (340) with a thread and a tip portion (350); and the fastener (300) has a diameter $D_U$ in a lower head portion (320) which is dimensioned such that, after completion of the setting operation, said lower head portion forms a form fit in the passage opening (140) of the component (100) in at least one direction.

* * * * *